United States Patent
Bent et al.

(10) Patent No.: US 9,454,331 B1
(45) Date of Patent: Sep. 27, 2016

(54) CLUSTER FILE SYSTEM WITH A BURST BUFFER APPLIANCE FOR COORDINATED CONTROL OF DATA MOVEMENT AMONG STORAGE TIERS ACROSS A PLURALITY OF OBJECT STORAGE SERVERS

(71) Applicant: EMC Corporation, Hopkinton, MA (US)

(72) Inventors: John M. Bent, Los Alamos, NM (US);
Sorin Faibish, Newton, MA (US);
Uday Gupta, Westford, MA (US); Tao Peng, Beijing (CN)

(73) Assignee: EMC Corporation, Hopkinton, MA (US)

( * ) Notice: Subject to any disclaimer, the term of this patent is extended or adjusted under 35 U.S.C. 154(b) by 391 days.

(21) Appl. No.: 13/928,940

(22) Filed: Jun. 27, 2013

(51) Int. Cl.
*G06F 12/00* (2006.01)
*G06F 17/30* (2006.01)
*G06F 3/06* (2006.01)

(52) U.S. Cl.
CPC ..................... *G06F 3/067* (2013.01)

(58) Field of Classification Search
CPC ........... G06F 17/30067; G06F 3/0643; G06F 11/1435; G06F 11/1471; G06F 12/0246; G06F 3/0679; G11B 27/034
USPC .................................................. 707/823, 824
See application file for complete search history.

(56) References Cited

U.S. PATENT DOCUMENTS

| | | | |
|---|---|---|---|
| 8,250,236 B2* | 8/2012 | Betts et al. ................... | 709/245 |
| 8,972,465 B1* | 3/2015 | Faibish et al. ................ | 707/822 |
| 2013/0227194 A1 | 8/2013 | Kannan et al. | |
| 2014/0082310 A1* | 3/2014 | Nakajima ........... | G06F 12/0862 711/162 |
| 2014/0351300 A1 | 11/2014 | Uppu et al. | |

* cited by examiner

*Primary Examiner* — Robert Beausoliel, Jr.
*Assistant Examiner* — Michael Pham
(74) *Attorney, Agent, or Firm* — Ryan, Mason & Lewis, LLP

(57) ABSTRACT

A cluster file system comprises a burst buffer appliance coupled to a plurality of object storage servers via a network. The burst buffer appliance is configured to implement storage tiering control functionality for at least first and second storage tiers comprising respective disjoint subsets of the plurality of object storage servers. The burst buffer appliance implements a coordinated movement of data between the first and second storage tiers to pre-fetch at least one additional portion of a single logical file that is stored across a plurality of said object storage devices from another of said plurality of object storage devices. The burst buffer appliance optionally implements the coordinated movement of data between the first and second storage tiers such that substantially all portions of a single logical file that are stored across a plurality of said object storage devices in said cluster file system are stored in only one of said storage tiers at a given time.

26 Claims, 9 Drawing Sheets

```
# write data
write(buffer,file,offset,length) {
        # do like normal lustre osd with a few exceptions
        # 1. send activity log to PLFS daemon, wait for permission
        # 2. send all write data to fast flash devices

} read data
read(buffer,file,offset,length) {
        # do like normal lustre osd with a few exceptions
        # 1. check whether file data is in flash or disk
        # 2. if in disk, ask data placement and migration
              controller 440 to start copying data into flash
        # 3. send activity log to PLFS daemon
}
```

FIG. 7

```
                                                                    ┌700
# get activity log both from OSD-Burst Buffer 150 and from other daemons 700.
OSD-Burst Buffer 150 sends writes, reads, unlinks.
# other plfs daemon counterparts will send pre-stage requests/suggestions
receive_activity_log(event e) {
        if (e.type == WRITE) {
                # if a write, record timestamp, and reserve space for it on
                # flash device. Keep a list of all blocks in flash. When
                # space runs low, ask data placement and migration controller 440
                # to move some blocks to disk.
                available_blocks -= e.size;
                if (available_blocks <= space_threshold) {
                        victims = search_for_victims()
                        msg = pack_msg(victims,EVICT)
                        send_msg(msg,data_mover)
                }
                if (e.size > available_blocks) {
                        # wait for free space
                }
        } elif e.type == UNLINK {
                available_blocks += e.size;
        } elif e.type == READ {
                # if a read, make a guess about whether to start prefetching
                rest of data
                if (e.file in recent_activity AND e.file NOT in flash)
                {# this file is hot on disk!
                        msg = pack_msg(e.file,PRESTAGE)
                        plfs_map = plfs_get_map(e.file)
                        foreach osd in plfs_map.osds {
                                send_msg(msg,osd) # suggest to peers that they
                                start prestaging this
                        }
                        send_msg(msg,data_mover) # also promote this file locally
                }
        } elif e.type == PRESTAGE { # a peer suggested we start prestaging this
                if (e.file NOT in flash) {
                        msg = pack_msg(e.file,PRESTAGE)
                        send_msg(msg,osd)
                }
        }
}
```

CLUSTER FILE SYSTEM WITH A BURST BUFFER APPLIANCE FOR COORDINATED CONTROL OF DATA MOVEMENT AMONG STORAGE TIERS ACROSS A PLURALITY OF OBJECT STORAGE SERVERS

CROSS-REFERENCE TO RELATED APPLICATIONS

The present application is related to United States Patent Application entitled "Cluster File System with a Burst Buffer Appliance for Controlling Movement of Data Among Storage Tiers;" and United States Patent Application entitled "Cluster File System with a Burst Buffer Appliance for Coordinated Control of Data Movement Among Storage Tiers Based on User Specification," each filed contemporaneously herewith and incorporated by reference herein.

FIELD

The field relates generally to data storage, and more particularly to parallel file systems and other types of cluster file systems.

BACKGROUND

A cluster file system allows multiple client devices to share access to files over a network. One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage capacity, and hundreds of gigabytes per second of aggregate input-output (IO) throughput. Due to its high performance and scalability, Lustre is utilized in many supercomputers, as well as other complex computing environments, including large enterprise data centers.

In conventional Lustre implementations, it can be difficult to balance the conflicting requirements of storage capacity and IO throughput. IO operations on object storage servers are generally performed directly with back-end storage arrays associated with those servers, and the corresponding storage devices may not be well matched to the current needs of the system. This can lead to situations in which either performance is less than optimal or the costs of implementing the system become excessive.

Accordingly, despite the many advantages of Lustre file systems and other similar cluster file systems, a need remains for additional improvements, particularly with regard to IO operations. For example, further acceleration of IO operations, leading to enhanced system performance relative to conventional arrangements, would be desirable. Additionally or alternatively, an ability to achieve particular levels of performance at lower cost would be advantageous.

SUMMARY

Illustrative embodiments of the present invention provide cluster file systems that implement coordinated storage tiering control functionality across a plurality of object storage servers using a burst buffer appliance, so as to provide significant improvements relative to conventional arrangements. For example, such arrangements allow for transparent inclusion of a flash storage tier in a cluster file system in a manner that avoids the need for any significant changes to clients, object storage servers, metadata servers or applications running on those devices.

In one embodiment, a cluster file system comprises a burst buffer appliance coupled to a plurality of object storage servers via a network. The burst buffer appliance is configured to implement storage tiering control functionality for at least first and second storage tiers comprising respective disjoint subsets of the plurality of object storage servers. The burst buffer appliance implements a coordinated movement of data between the first and second storage tiers to pre-fetch at least one additional portion of a single logical file that is stored across a plurality of said object storage devices from another of said plurality of object storage devices. A parallel log structured file system (PLFS) daemon may be employed to communicate with PLFS daemons on other object storage devices in the cluster file system to implement the coordinated movement of data. The PLFS daemon notifies one or more PLFS daemons on the other object storage devices to pre-fetch portions of a single logical file that are stored across a plurality of object storage devices.

According to a further aspect of the invention, the burst buffer appliance implements the coordinated movement of data between the first and second storage tiers such that substantially all portions of a single logical file that are stored across a plurality of said object storage devices in said cluster file system are stored in only one of said storage tiers at a given time.

The object storage servers in the first storage tier may be configured to interface with object storage targets of a first type and the object storage servers in the second storage tier may be configured to interface with object storage targets of a second type different than the first type. For example, the object storage targets of the first type may comprise non-volatile electronic storage devices such as flash storage devices, and the object storage targets of the second type may comprise disk storage devices.

As noted above, illustrative embodiments described herein provide significant improvements relative to conventional arrangements. In some of these embodiments, use of a flash storage tier in conjunction with a disk storage tier allows dynamic balancing of storage capacity and IO throughput requirements in a cluster file system, thereby allowing particular levels of performance to be achieved at a significantly lower cost than would otherwise be possible. Similar improvements are provided using other numbers and types of storage tiers, with migration between the tiers being controlled by one or more burst buffers of the cluster file system.

DETAILED DESCRIPTION

Illustrative embodiments of the present invention will be described herein with reference to exemplary cluster file systems and associated clients, servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of processing devices.

According to one aspect of the invention, discussed further below in conjunction with FIGS. 8-10, cluster file systems implement coordinated storage tiering control functionality across a plurality of object storage servers using one or more burst buffer appliances.

Figure 1:
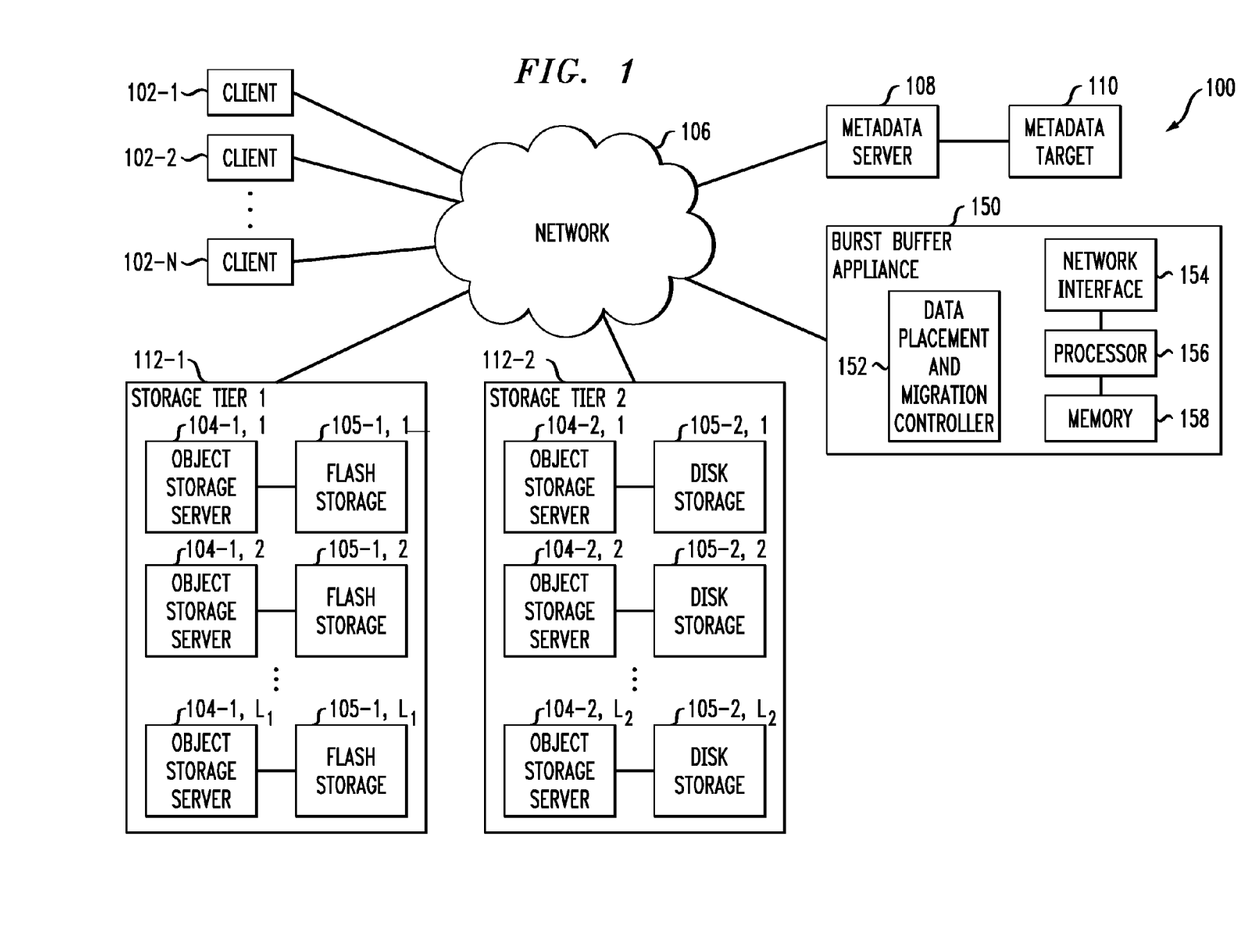
FIG. 1 is a block diagram of a cluster file system having multiple storage tiers and a burst buffer appliance in an illustrative embodiment of the invention.

FIG. 1 shows a cluster file system 100 configured in accordance with an illustrative embodiment of the present invention. The cluster file system 100 comprises a plurality of clients 102 and a plurality of object storage servers 104. More particularly, the cluster file system 100 comprises N clients denoted 102-1, 102-2, . . . 102-N, and two groups of object storage servers denoted 104-1,1 through 104-1,$L_1$ and 104-2,1 through 104-2,$L_2$. Each of the object storage servers 104 has a corresponding storage device 105 which may comprise a storage array or other type of storage device. Thus, the object storage servers 104-1,1 through 104-1,$L_1$ and 104-2,1 through 104-2,$L_2$ have associated storage devices 105-1,1 through 105-1,$L_1$ and 105-2,1 through 105-2,$L_2$, respectively. The clients 102 and the object storage servers 104 communicate with one another over a network 106. The storage devices 105 are also referred to herein as object storage targets of their corresponding object storage servers 104.

The cluster file system 100 further comprises a metadata server 108 having an associated metadata target 110. The metadata server 108 is configured to communicate with clients 102 and object storage servers 104 over the network 106. For example, the metadata server 108 may receive metadata requests from the clients 102 over the network 106 and transmit responses to those requests back to the clients over the network 106. The metadata server 108 utilizes its metadata target 110 in processing metadata requests received from the clients 102 over the network 106. The metadata target 110 may comprise a storage array or other type of storage device.

Storage arrays utilized in the cluster file system 100 may comprise, for example, storage products such as VNX® and Symmetrix VMAX®, both commercially available from EMC Corporation of Hopkinton, Mass. A variety of other storage products may be utilized to implement at least a portion of the object storage targets and metadata target of the cluster file system 100.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The term "network" as used herein is therefore intended to be broadly construed, so as to encompass a wide variety of different network arrangements, including combinations of multiple networks possibly of different types.

The object storage servers 104 in the present embodiment are arranged into first and second storage tiers 112-1 and 112-2, also denoted as Storage Tier 1 and Storage Tier 2, although it is to be appreciated that more than two storage tiers may be used in other embodiments. As noted above, each of the storage devices 105 may be viewed as being representative of an object storage target of the corresponding one of the object storage servers 104. The first and second storage tiers 112-1 and 112-2 comprise respective disjoint subsets of the object storage servers 104. More particularly, the first storage tier 112-1 comprises object storage servers 104-1,1 through 104-1,$L_1$ and the corresponding storage devices 105-1,1 through 105-1,$L_1$, and the second storage tier 112-2 comprises object storage servers 104-2,1 through 104-2,$L_2$ and the corresponding storage devices 105-2,1 through 105-2,$L_2$.

The client 102 may also be referred to herein as simply a "user." The term "user" should be understood to encompass, by way of example and without limitation, a user device, a person utilizing or otherwise associated with the device, a software client executing on a user device or a combination thereof. An operation described herein as being performed by a user may therefore, for example, be performed by a user device, a person utilizing or otherwise associated with the device, a software client or by a combination thereof.

The different storage tiers 112-1 and 112-2 in this embodiment comprise different types of storage devices 105 having different performance characteristics. As mentioned previously, each of the object storage servers 104 is configured to interface with a corresponding object storage target in the form of a storage device 105 which may comprise a storage array. The object storage servers 104-1,1 through 104-1,$L_1$ in the first storage tier 112-1 are configured to interface with object storage targets of a first type and the object storage servers 104-2,1 through 104-2,$L_2$ in the second storage tier 112-2 are configured to interface with object storage targets of a second type different than the first type. More particularly, in the present embodiment, the object storage targets of the first type comprise respective flash storage devices 105-1,1 through 105-1,$L_1$, and the object storage targets of the second type comprise respective disk storage devices 105-2,1 through 105-2,$L_2$.

The flash storage devices of the first storage tier 112-1 are generally significantly faster in terms of read and write access times than the disk storage devices of the second storage tier 112-2. The flash storage devices are therefore considered "fast" devices in this embodiment relative to the "slow" disk storage devices. Accordingly, the cluster file system 100 may be characterized in the present embodiment as having a "fast" storage tier 112-1 and a "slow" storage tier 112-2, where "fast" and "slow" in this context are relative terms and not intended to denote any particular absolute performance level. These storage tiers comprise respective disjoint subsets of the object storage servers 104 and their associated object storage targets 105. However, numerous alternative tiering arrangements may be used, including three or more tiers each providing a different level of performance. The particular storage devices used in a given storage tier may be varied in other embodiments and multiple distinct storage device types may be used within a single storage tier.

Also, although only a single object storage target is associated with each object storage server 104 in the FIG. 1 embodiment, other embodiments may associate multiple object storage targets with each object storage server. An example of an arrangement of the latter type will be described below in conjunction with FIG. 2.

The flash storage devices 105-1,1 through 105-1,$L_1$ may be implemented, by way of example, using respective flash Peripheral Component Interconnect Express (PCIe) cards or other types of memory cards installed in a computer or other processing device that implements the corresponding object storage server 104. Numerous alternative arrangements are possible. Also, a variety of other types of non-volatile or volatile memory in any combination may be used to implement at least a portion of the storage devices 105. Examples of alternatives to flash storage devices that may be used as respective object storage targets in other embodiments of the invention include non-volatile memories such as magnetic random access memory (MRAM) and phase change random access memory (PC-RAM).

The flash storage devices of the first storage tier 112-1 generally provide higher performance than the disk storage devices but the disk storage devices of the second storage tier 112-2 generally provide higher capacity at lower cost than the flash storage devices. The exemplary tiering arrangement of FIG. 1 therefore makes it possible to dynamically balance the conflicting requirements of storage capacity and IO throughput, thereby avoiding situations in which either performance is less than optimal or the costs of implementing the system become excessive. Arrangements of this type can provide further acceleration of IO operations in the cluster file system 100, leading to enhanced system performance relative to conventional arrangements, while additionally or alternatively providing an ability to achieve particular levels of performance at lower cost.

The cluster file system 100 further comprises a burst buffer appliance 150 configured to communicate with clients 102, object storage servers 104 and metadata servers 108 over the network 106. The burst buffer appliance 150 in the present embodiment is assumed to comprise a flash memory or other high-speed memory having a substantially lower access time than the storage tiers 112. The burst buffer appliance 150 may optionally comprise an analytics engine, and may include other components.

Although flash memory will often be used for the high-speed memory of the burst buffer appliance 150, other types of low-latency memory could be used instead of flash memory. Typically, such low-latency memories comprise electronic memories, which may be implemented using non-volatile memories, volatile memories or combinations of non-volatile and volatile memories. Accordingly, the term "burst buffer appliance" as used herein is intended to be broadly construed, so as to encompass any network appliance or other arrangement of hardware and associated software or firmware that collectively provides a high-speed memory and optionally an analytics engine to control access to the high-speed memory. Thus, such an appliance includes a high-speed memory that may be viewed as serving as a buffer between a computer system comprising clients 102 executing on compute nodes (not shown) and a file system such as storage tiers 112, for storing bursts of data associated with different types of IO operations.

In the FIG. 1 embodiment, storage tiering control functionality is implemented in the burst buffer appliance 150 in a manner that avoids the need for any significant changes to clients 102, object storage servers 104, metadata server 108 or applications running on those devices.

More particularly, in this embodiment of FIG. 1, the burst buffer appliance 150 comprises a data placement and migration controller 152. The data placement and migration controller 152 is configured to implement storage tiering control functionality for the first and second storage tiers 112-1 and 112-2 which as noted above comprise respective disjoint subsets of the object storage servers 104. The burst buffer appliance 150 is thereby configured to control movement of data between the storage devices 105 of the first and second storage tiers 112-1 and 112-2. Examples of such movement will be described below. The data placement and migration controller 152 may be viewed as one possible example of what is more generally referred to herein as a "controller," and numerous alternative controllers having various configurations may be used in a given metadata server in other embodiments.

The burst buffer appliance 150 further comprises a processor 156 coupled to a memory 158. The processor 156 may comprise a microprocessor, a microcontroller, an application-specific integrated circuit (ASIC), a field-programmable gate array (FPGA) or other type of processing circuitry, as well as portions or combinations of such circuitry elements. The memory 158 may comprise random access memory (RAM), read-only memory (ROM) or other types of memory, in any combination.

The memory 158 and other memories disclosed herein may be viewed as examples of what are more generally referred to as "computer program products" storing executable computer program code.

Also included in the burst buffer appliance 150 is network interface circuitry 154. The network interface circuitry 154 allows the burst buffer appliance 150 to communicate over the network 106 with the clients 102, object storage servers 104 and metadata servers 108. The network interface circuitry 154 may comprise, for example, one or more conventional transceivers.

The data placement and migration controller 152 of the burst buffer appliance 150 may be implemented at least in part in the form of software that is stored in memory 158 and executed by processor 156.

The burst buffer appliance 150 comprising processor, memory and network interface components as described above is an example of what is more generally referred to herein as a "processing device." Each of the clients 102, object storage servers 104 and metadata servers 108 may similarly be implemented as a processing device comprising processor, memory and network interface components.

Although only a single burst buffer appliance 150 is shown in the FIG. 1 embodiment, a given cluster file system in other embodiments may comprise multiple burst buffer appliances 150.

The cluster file system 100 may be implemented, by way of example, in the form of a Lustre file system, although use of Lustre is not a requirement of the present invention. Accordingly, servers 104 and 108 need not be configured with Lustre functionality, but may instead represent elements of another type of cluster file system. An example of a Lustre file system configured in accordance with an embodiment of the invention will now be described with reference to FIG. 2.

Figure 2:
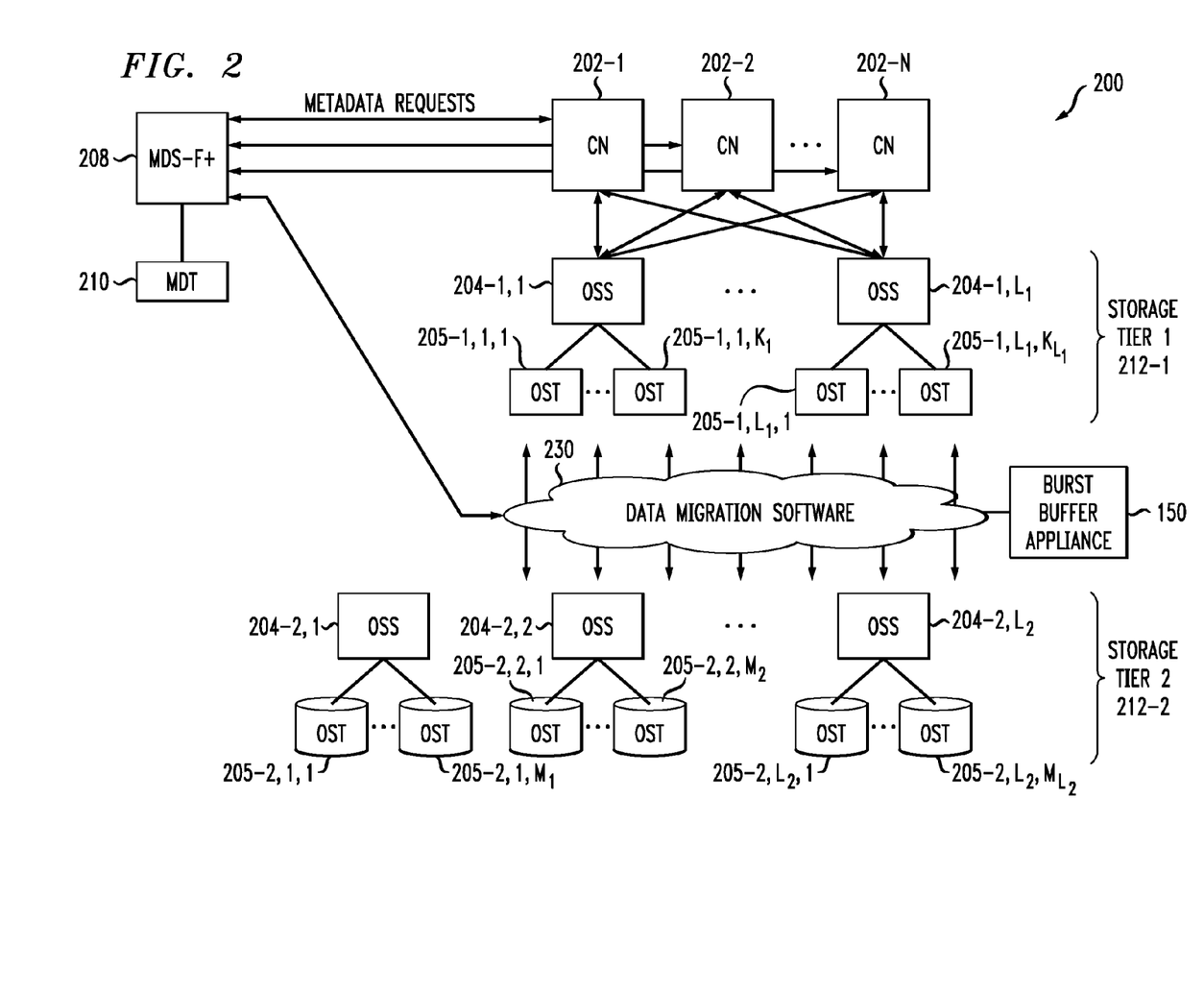
FIG. 2 is a block diagram of another illustrative embodiment of a cluster file system with a burst buffer appliance for controlling movement of data between storage tiers.

As illustrated in FIG. 2, a Lustre file system 200 in an embodiment of the invention comprises a plurality of clients 202-1, 202-2, . . . 202-N, a plurality of object storage servers 204, a plurality of object storage targets 205, and a metadata server 208 having a corresponding metadata target 210. The clients 202 are more particularly referred to as compute nodes (CNs) in this embodiment. The object storage servers 204, object storage targets 205, metadata server 208 and metadata target 210 are also denoted in this figure as Lustre OSS, OST, MDS and MDT elements, respectively.

A given OSS 204 exposes multiple OSTs 205 in the present embodiment. Each of the OSTs may comprise one or more storage arrays or other types of storage devices. The total data storage capacity of the Lustre file system 200 is the sum of all the individual data storage capacities represented by the OSTs 205. The clients 202 can concurrently access this collective data storage capacity using data IO requests directed to the OSSs 204 based on metadata obtained from the MDS 208. The IO requests and other similar requests herein may be configured, for example, in accordance with standard portable operating system interface (POSIX) system calls.

The MDS 208 utilizes the MDT 210 to provide metadata services for the Lustre file system 200. The MDT 210 stores file metadata, such as file names, directory structures, and access permissions.

Additional details regarding conventional aspects of Lustre file systems may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

As indicated previously, it is difficult in conventional Lustre implementations to balance the conflicting requirements of storage capacity and IO throughput. This can lead to situations in which either performance is less than optimal or the costs of implementing the system become excessive.

In the present embodiment, these and other drawbacks of conventional arrangements are addressed by configuring the burst buffer appliance 150 of the Lustre file system 200 to incorporate storage tiering control functionality. As will be described, such arrangements advantageously allow for transparent inclusion of a flash storage tier in a cluster file system in a manner that avoids the need for any significant changes to clients, object storage servers, metadata servers or applications running on those devices. Again, other types and configurations of multiple storage tiers and associated storage devices may be used. Also, multiple burst buffers 150 may be implemented in the system in other embodiments.

The particular storage tiering arrangement implemented in Lustre file system 200 includes first and second storage tiers 212-1 and 212-2, with data migration software 230 being utilized to control movement of data between the tiers. Although shown as separate from the burst buffer appliance 150, the data migration software 230 is assumed to be implemented at least in part in a controller of the burst buffer appliance 150, which may be similar to the data placement and migration controller 152 utilized in the FIG. 1 embodiment. Exemplary features of the data migration software and other functionality associated with a controller of a burst buffer appliance 150 will be described below. Other portions of the data migration software 230 are assumed to be implemented in other system components, such as the OSSs of the first and second storage tiers 212-1 and 212-2.

In the first storage tier 212-1, there are $L_1$ OSSs having $K_1, K_2, \ldots K_{L1}$ OSTs, respectively. Thus, for example, OSS 204-1,1 has OSTs denoted 205-1,1,1 through 205-1,1,$K_1$, and OSS 204-1,$L_1$ has OSTs denoted 205-1, $L_1$,1 through 205-1, $L_1$,$K_{L1}$.

In the second storage tier 212-2, there are $L_2$ OSSs having $M_1, M_2, \ldots M_{L2}$ OSTs, respectively. Thus, for example, OSS 204-2,1 has OSTs denoted 205-2,1,1 through 205-2,1, $M_1$, OSS 204-2,2 has OSTs denoted 205-2,2,1 through 205-2,2,$M_2$, and OSS 204-2,$L_2$ has OSTs denoted 205-2, $L_2$,1 through 205-2, $L_2$,$M_{L2}$.

As in the FIG. 1 embodiment, it is assumed that the OSTs of the first storage tier 212-1 are "fast" relative to the "slow" OSTs of the second storage tier 212-2. For example, the OSTs of the first storage tier 212-1 may comprise primarily flash storage devices and the OSTs of the second storage tier 212-2 may comprise primarily disk storage devices. As mentioned previously, the flash storage devices generally provide higher performance than the disk storage devices but the disk storage devices generally provide higher capacity at lower cost than the flash storage devices. Like the FIG. 1 embodiment, the exemplary tiering arrangement of FIG. 2 makes it possible to dynamically balance the conflicting requirements of storage capacity and IO throughput, thereby avoiding situations in which either performance is less than optimal or the costs of implementing the system become excessive. This is achieved in the present embodiment primarily by introduction of the burst buffer appliance 150, and therefore with minimal disruption to other system elements such as clients 102, object storage servers 104, metadata servers 208 or applications running on those devices. The MDS 208 in the FIG. 2 embodiment is also denoted as an MDS-F+ component as it is configured to support a flash extension of the cluster file system 200 using a flash storage tier as previously described.

It should be noted with regard to the illustrative embodiments of FIGS. 1 and 2 that relatively minor modifications may be made to one or more applications or other system elements or components in order to achieve additional improvements. For example, a job scheduler or other similar component within the system 100 or 200 can also be modified so as to take full advantage of the available storage tiering functionality. Also, some relatively minor modifications may be made to at least a portion of the object storage servers 104 or 204. For example, object storage servers of each of the storage tiers 112 or 212 in the system 100 or 200 may be optimized for use with the corresponding storage device type of their corresponding storage tier.

Figure 3:
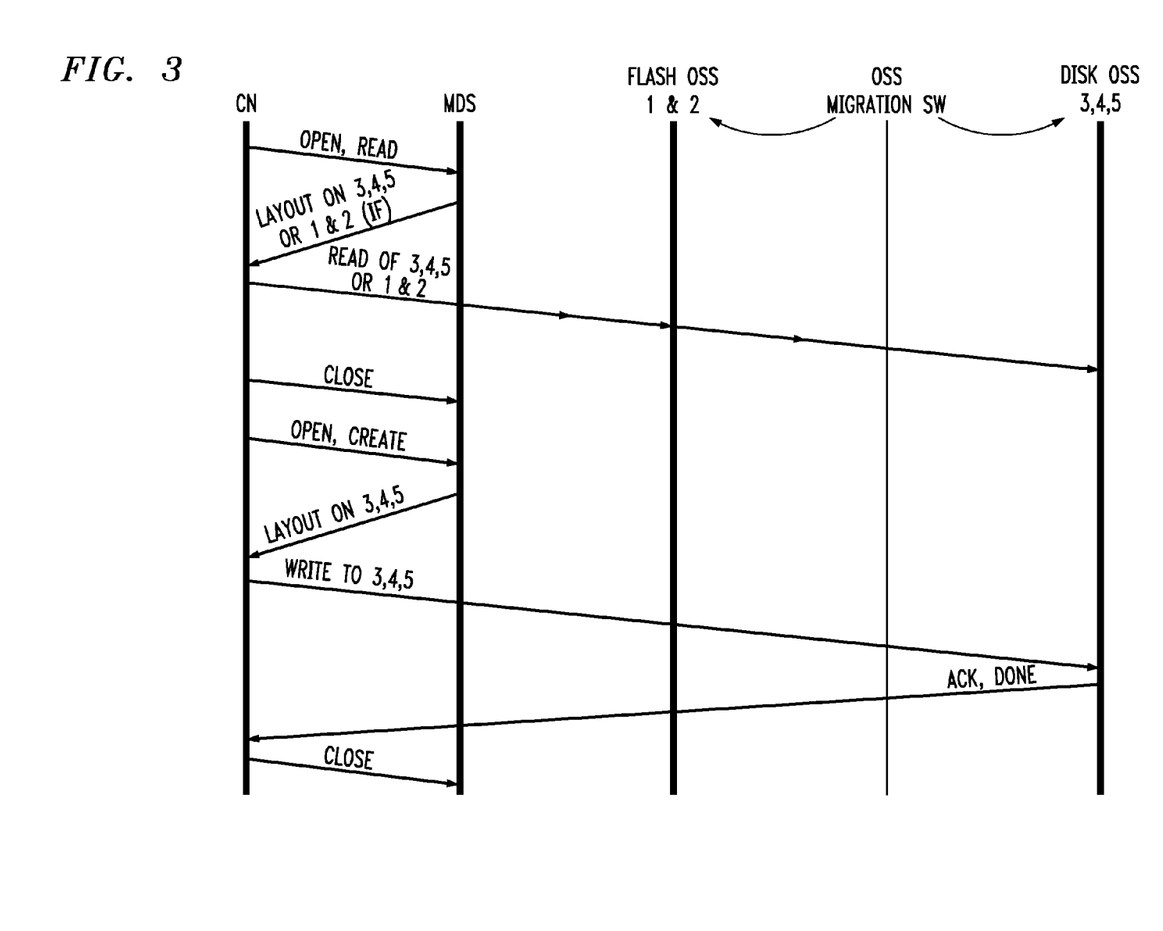
FIG. 3 is a flow diagram illustrating exemplary operations of a cluster file system in illustrative embodiments.

Examples of operations that may be performed in the system 100 or 200 utilizing the burst buffer appliance 150 will now be described in more detail with reference to the flow diagram of FIG. 3. In FIG. 3, interactions are shown between system elements including a given client 102 or 202 denoted CN, metadata server 108 or 208 denoted MDS, a flash storage tier 112-1 or 212-1 comprising object storage servers 104 or 204 denoted OSS 1 and OSS 2, and a disk storage tier 112-2 or 212-2 comprising object storage servers 104 or 204 denoted OSS 3, OSS 4 and OSS 5. Migration of data between the storage tiers is carried out using data migration software 230 which is assumed to be provided at least in part by a controller of the burst buffer appliance 150, although it is illustrated in FIG. 3 as a separate component denoted OSS Migration SW. Portions of the OSS Migration SW are assumed to be implemented in the OSSs of the storage tiers.

In these examples, as in other embodiments described herein, the flash storage tier is also referred to as a "fast" storage tier and the disk storage tier is also referred to as a "slow" storage tier. Again, the terms "fast" and "slow" in this context are relative terms and should not be construed as requiring any particular absolute performance levels.

Referring now more particularly to the flow diagram of FIG. 3, the operations illustrated herein include exemplary read and write operations that are performed without any migration of data between storage tiers. The client CN sends an "open, read" request to the MDS which responds with metadata that is assumed to comprise a layout of at least a portion of the flash storage tier comprising OSSs 1 and 2, or a layout of at least a portion of the disk storage tier comprising OSSs 3, 4 and 5, if the requested data resides in one of those tiers. The read operation is then performed by the CN interacting with one or more of the OSSs of the appropriate storage tier using the layout metadata provided by the MDS. Upon completion of the read operation, a "close" request is sent by the CN to the MDS as indicated.

The client CN then sends an "open, create" request to the MDS which responds with metadata that is assumed to comprise a layout of at least a portion of the disk storage tier comprising OSSs 3, 4 and 5. The write operation is then performed by the CN interacting with one or more of the OSSs of the disk storage tier using the layout metadata provided by the MDS. Upon completion of the write operation, an acknowledgement message denoted "ack, done" is provided by the appropriate OSS of the disk storage tier back to the CN. A "close" request is then sent by the CN to the MDS as indicated.

Figure 4:
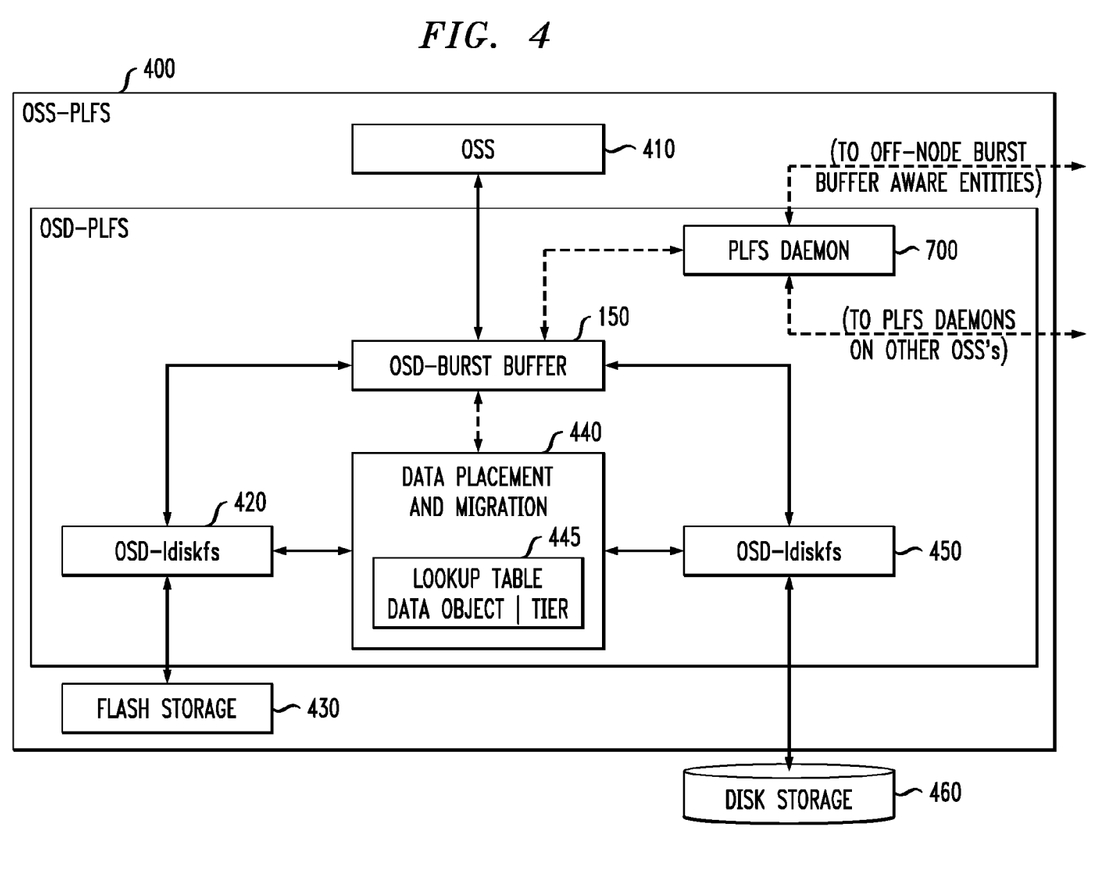
FIG. 4 is a block diagram of an exemplary OSS with a burst buffer appliance for controlling movement of data between storage tiers.

FIG. 4 is a block diagram of an exemplary OSS 400 with a burst buffer appliance 150 for controlling movement of data between storage tiers 112. The exemplary OSS 400 allows the cluster file system 100 of FIG. 1 to communicate with a parallel log structured file system (PLFS) in accordance with one aspect of the present invention. As indicated above, the exemplary burst buffer appliance 150 implements storage tiering control functionality in a manner that avoids the need for any significant changes to clients 102, object storage servers 104, metadata server 108 or applications running on those devices. The parallel log structured file system (PLFS) may be based on, for example, John Bent et al., "PLFS: A Checkpoint Filesystem for Parallel Applications," Int'l Conf. for High Performance Computing, Networking, Storage and Analysis 2009 (SC09) (November 2009), incorporated by reference herein.

As shown in FIG. 4, the OSS-PLFS 400 comprises an OSS 410 that communicates with an OSD-burst buffer 150, as discussed further below in conjunction with FIG. 6. The OSD-burst buffer 150 communicates with a data placement and migration controller 440 and a PLFS daemon 700, as discussed further below in conjunction with FIG. 7 to implement functions of the present invention. The data placement and migration controller 440 may be at least partially implemented as part of the OSD-burst buffer 150 as a controller 152, as discussed above in conjunction with FIG. 1. As indicated above, the data placement and migration controller 440 actually moves the data in response to certain system calls, such as plfs_file_purge and plfs_file_prestage operations, discussed below.

In one exemplary implementation, the OSD-PLFS of FIG. 4 will maintain a lookup table 445 in the data placement and migration controller 440 for every data object that it stores, indicating whether the corresponding object is stored in a flash tier or a disk tier in the exemplary embodiment. As noted above, additional or alternative storage tiers are also within the scope of the present invention.

The exemplary PLFS daemon 700 runs on each OSS node 400 and communicates with the OSD. For example, a client 102 on a compute node may request data from an OSS. The OSS notifies the PLFS daemon 700 on the OSS 400 of the data request. The PLFS daemon 700 on the originating OSS 400 knows that the exemplary requested data is part of a logical file that is striped across a plurality of OSSs 400. The originating PLFS daemon 700 can then notify PLFS daemons 700 on other OSSs 400 storing portions of the requested logical file of the request and indicate that the other OSSs 400 should pre-fetch their data portions. The exemplary PLFS daemon 700 can also optionally communicate with off-node burst buffer-aware entities.

As shown in FIG. 4, the OSS 400 further comprises an OSD-ldiskfs (local disk file system) 420 for a flash storage system 430 and disk storage system 460, respectively, in a known manner.

Figure 5:
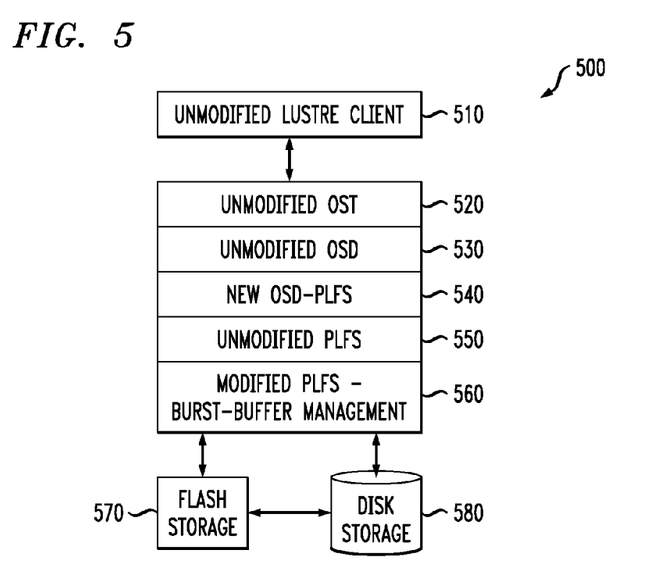
FIG. 5 illustrates an exemplary stack for the OSD-PLFS of FIG. 4.

FIG. 5 illustrates an exemplary stack 500 for the OSD-PLFS 400 of FIG. 4. As indicated above, the exemplary burst buffer appliance 150 implements storage tiering control functionality in a manner that avoids the need for any significant changes to clients 102, object storage servers 104, metadata server 108 or applications running on those devices. Thus, layers 510, 520, 530 and 550 of the exemplary stack 500 are unmodified, relative to a conventional Lustre implementation.

Layer 540 is a modified layer of the stack 500, corresponding to the OSD-PLFS of FIG. 4. In this manner, an additional file system plug in or file system interface is provided for the abstract layer of Lustre (in addition to, for example, existing ZFS and ldiskfs plug ins/file system interfaces).

Layer 560 is also a modified layer of the stack 500, corresponding to the modified burst buffer implementation of PLFS which comprises the data migration functionality of burst buffer PLFS in accordance with the present invention, as well as conventional PLFS burst buffer functionality. As discussed above, the burst buffer appliance 150 communicates with flash storage 570 (such as flash storage 105-1 of FIG. 1) and disk storage 580 (such as disk storage 105-2) to migrate data among the various storage tiers 112.

For a more detailed discussion of stacks for Lustre clustered file systems, see, for example, A. Dilger et al., "Lustre on ZFS," Lustre Admin and Developer Workshop (Sep. 24, 2012), incorporated by reference herein.

Figure 6:
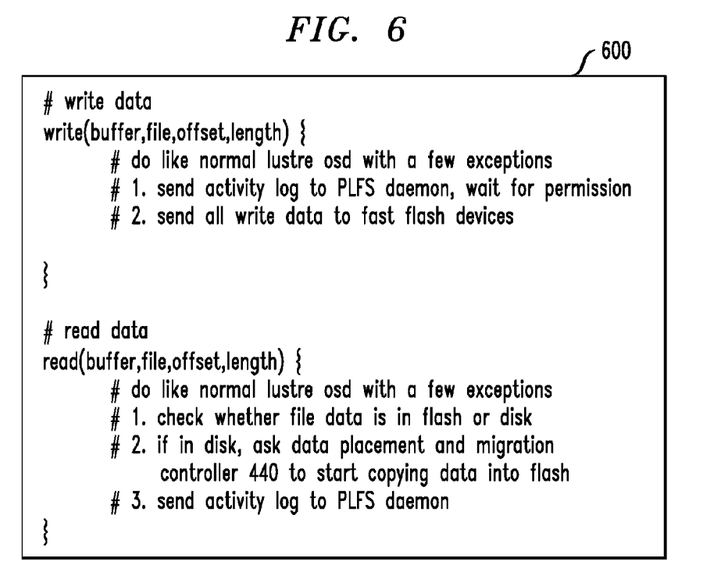
FIGS. 6 and 7 illustrate exemplary pseudo code for the OSD-Burst Buffer and PLFS daemon of FIG. 4.

FIG. 6 illustrates exemplary pseudo code 600 for the OSD-Burst Buffer 150 of FIGS. 1, 2 and 4. As shown in FIG. 6, the exemplary pseudo code 600 comprises functions for writing data and reading data. The write function initially writes all data to a flash storage device 105-1, which can then optionally be migrated later to a disk storage device 105-2 in the exemplary embodiment. Similarly, for a read operation, the OSD-Burst Buffer 150 accesses the lookup table 445 to determine whether data is stored on a flash storage device 105-1 or a disk storage device 105-2 (i.e., which tier is the data object stored on). If the data is stored on a disk storage device 105-2, the OSD-Burst Buffer 150 requests the data placement and migration controller 440 to move the data to a flash storage device 105-1 (and the lookup table is updated). An activity log is sent to the PLFS daemon 700.

Figure 7:
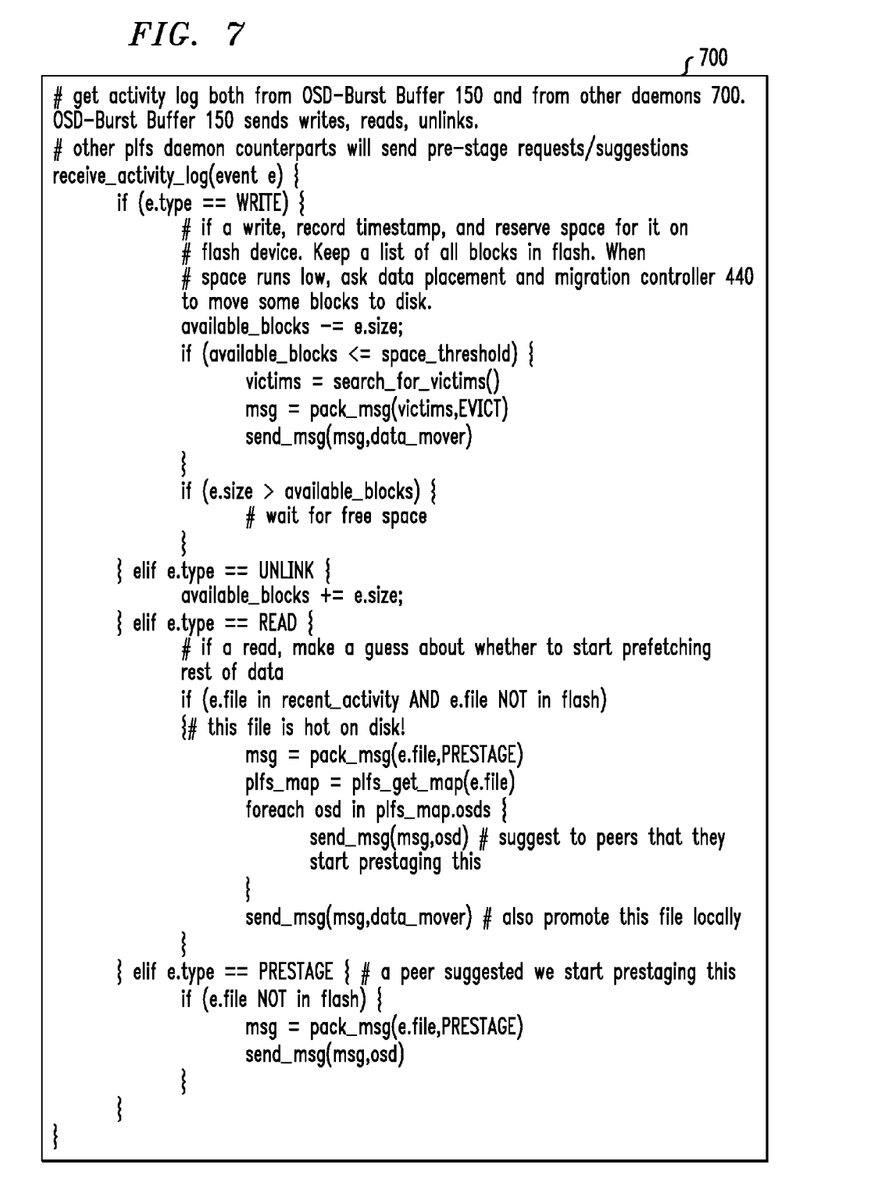

FIG. 7 illustrates exemplary pseudo code for the PLFS daemon 700 of FIG. 4. In an exemplary implementation, discussed above, the PLFS daemon 700 performs pre-staging whereby, upon a request for a portion of a logical file that is striped across a plurality of OSSs 400, the originating PLFS daemon 700 notifies PLFS daemons 700 on other OSSs 400 storing portions of a requested logical file of the request and indicates that the other OSSs 400 should pre-fetch their data portions.

As shown in FIG. 7, the exemplary PLFS daemon 700 initially receives an activity log from the OSD-Burst Buffer 150 and from other daemons 700, and/or write, read and/or unlink commands from the OSD-Burst Buffer 150 and/or pre-stage requests from other daemons 700.

The exemplary PLFS daemon 700 comprises functions for processing each possible received item. For example, upon a write operation, the exemplary PLFS daemon 700 will use an Evict command to request the data placement and migration controller 440 (FIG. 4) to move some victim blocks from flash storage 105-1 to disk storage 105-2 if there is not enough flash storage for the new write operation.

Similarly, for a read operation, the exemplary PLFS daemon 700 determines whether a file that is stored on a plurality of OSSs should be pre-fetched using a pre-stage command. Likewise, when another daemon 700 suggests pre-staging to the current PLFS daemon 700, the current PLFS daemon 700 employs a pre-stage operation.

Horizontal Coordinated Storage Tiering Control

As indicated above, one aspect of the invention provides coordinated storage tiering control functionality across a plurality of object storage servers using one or more burst buffer appliances in a cluster file system.

Figure 8:
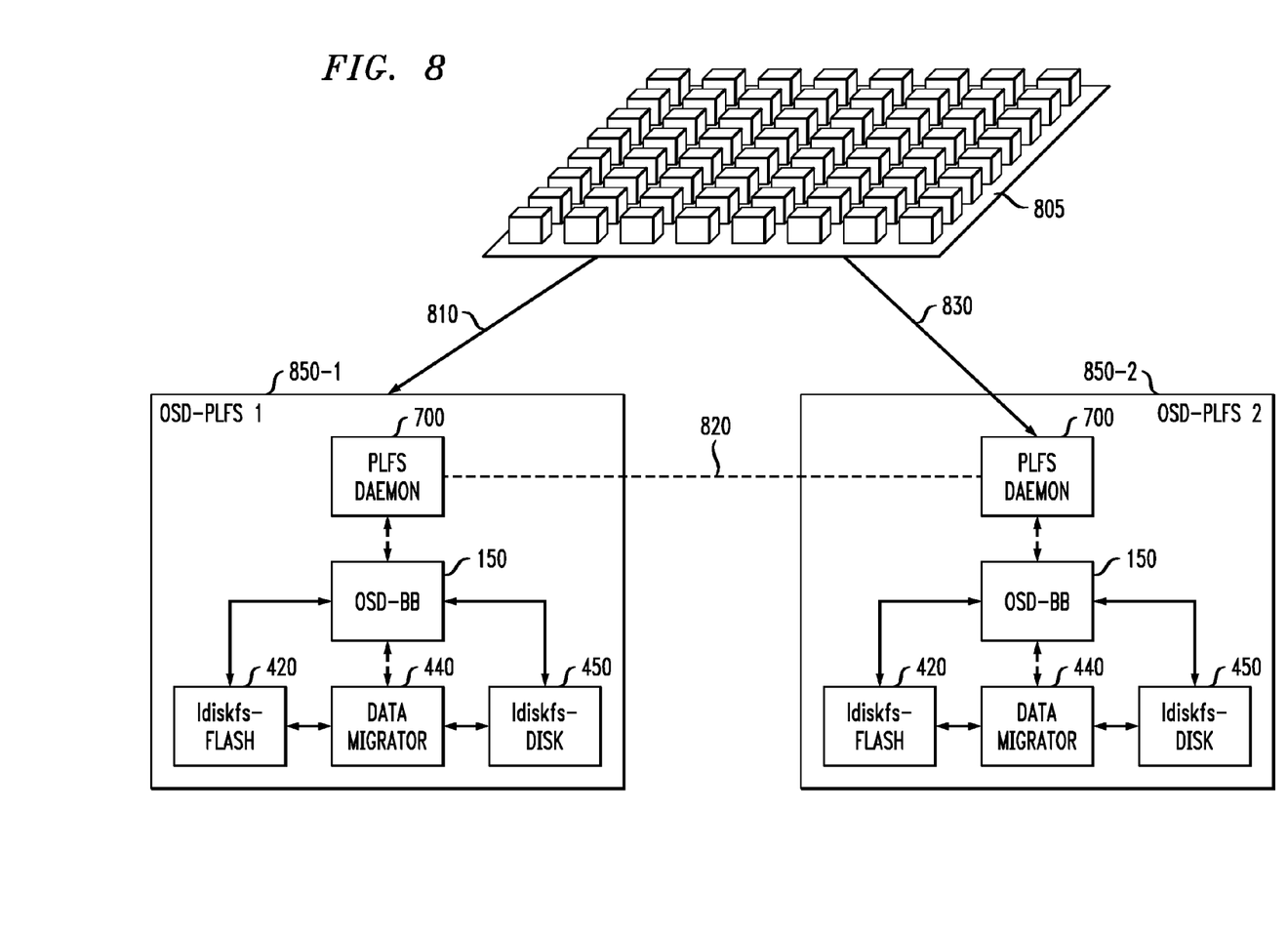
FIG. 8 illustrates an intelligent coordinated prefetch of one or more data items in accordance with aspects of the present invention.

FIG. 8 illustrates an intelligent coordinated prefetch of one or more data items in accordance with aspects of the present invention. As shown in FIG. 8, a plurality of compute nodes 805 in a high performance computing (HPC) network start reading objects at first OSD-PLFS 850-1 during step 810. The OSD-PLFS 850-1 may be implemented in a similar manner as the OSD-PLFS 400 of FIG. 4. The OSD-burst buffer 150 notifies the associated PLFS daemon 700 of the request. The PLFS daemon 700 then determines that the requested objects are stripes in a larger Lustre file, stored across a plurality of PLFS object store devices 850.

During step 820, the PLFS daemon 700 on the first (originating) OSD-PLFS 850-1 notifies its peer daemons 700 about this access. The peer daemons 700 notify their associated OSD-burst buffer 150-n who, in turn, notify the associated data migrator 440 on the node to begin prefetching the requested data.

Thereafter, a job on a compute node 805 requests those objects from a second OSD-PLFS 850-2 and the requested objects are now returned more quickly since they have been prefetched into the appropriate ldiskfs-flash storage 420 on the node of OSD-PLFS 850-2.

Figure 9:
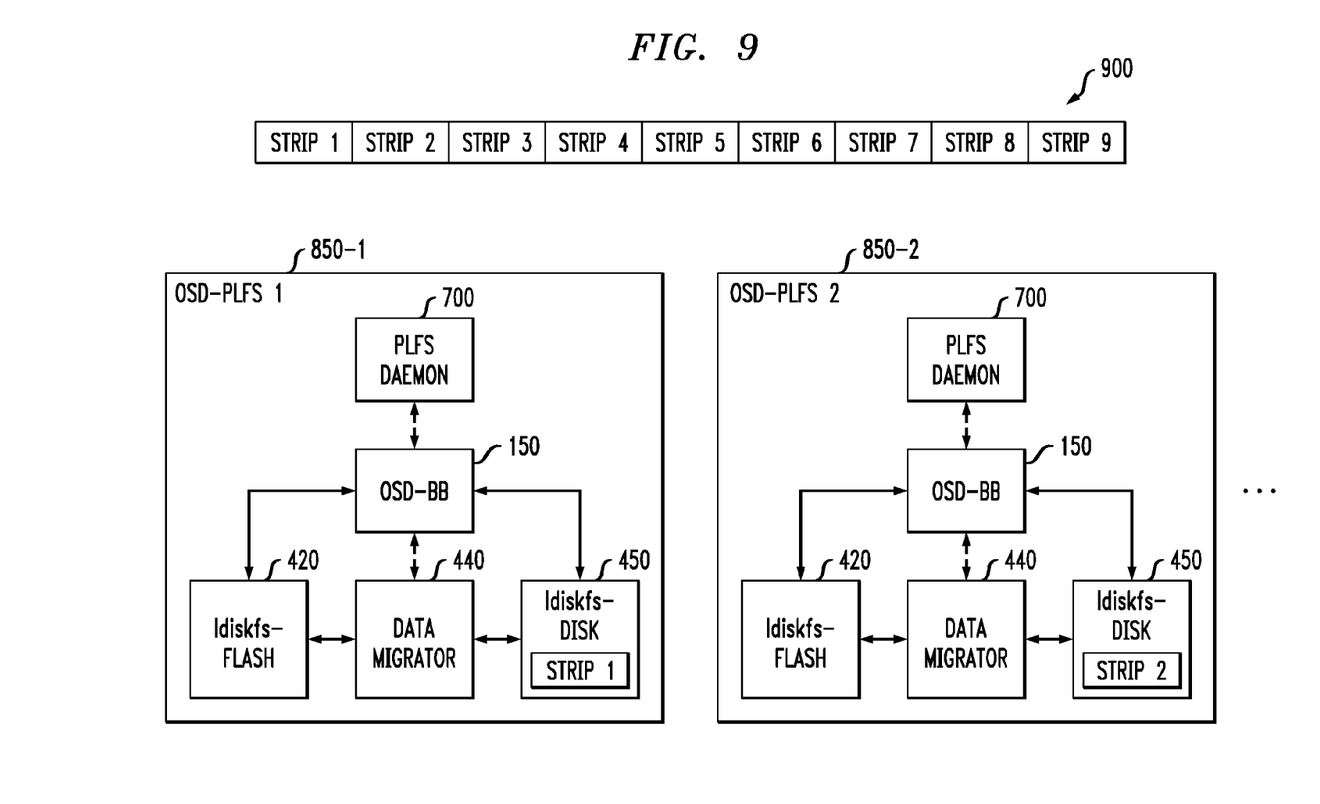
FIG. 9 illustrates a logical file that has been striped across a plurality of OSSs.

FIG. 9 illustrates a logical file 900 that has been striped across a plurality of OSSs, such as OSD-PLFS 850-1 and OSD-PLFS 850-2 of FIG. 8. Assume that the data in file 900 was written a while ago and has grown "cold." The PLFS daemon 700 has made the decision to move the cold data to the disk devices 105-2.

A user starts reading the data. The Lustre client 102 on the compute node 805 calls up the metadata server 108 that tells the client 102 that the file 900 is striped across the OSS's 850. The client 102 starts reading the first stripe strip1 from the first OSS 850-1, in a similar manner to a conventional Lustre file system.

In accordance with aspects of the present invention, the OSD-burst buffer 150 will start reading the data from strip1 and will also ask the data migrator 440 to copy the data from disk storage 105-2 to flash storage 105-1.

The OSD-burst buffer 150 will also send a log of activity to the PLFS daemon 700 which will notice that strip1 is being read and predicts that soon the rest of the related stripes from file 900 on other OSSs will be needed as well. The PLFS daemon 700 on the originating node 850-1 will therefore send a message to its counterpart daemons 700 on peer OSD nodes 850 that will then start the data movement with their data migrators 440. If the prediction is correct, the compute nodes 805 will soon start sending requests for the rest of the strips to the other OSS nodes 850. These reads will then be faster since the data will have been prefetched into a flash storage device 105-1.

According to a further aspect of the invention, the prefetching is coordinated among a plurality of PLFS-OSDs 850. Consider two files in the cluster file system 100, with half of each file being stored on a flash storage device 105-1 and the remainder of each file being stored on a disk storage device 105-2. Aspects of the present invention recognize that when a file is read in parallel from a parallel file system, typically the latency to read the file is the latency of the slowest reader (i.e., if every device reads relatively fast except for one slower reader device, there is no benefit gained since every device must wait on the slowest reader). Thus, when there are two files each only partially on flash, there is no real benefit to the flash storage.

Existing cluster file systems make independent data placement decisions within each OSS. This will make it more likely that many files are partially on flash as opposed to a few files being fully on flash. The horizontal coordinated communication across all OSSs with the present invention migrates files in their entirety.

Figure 10:
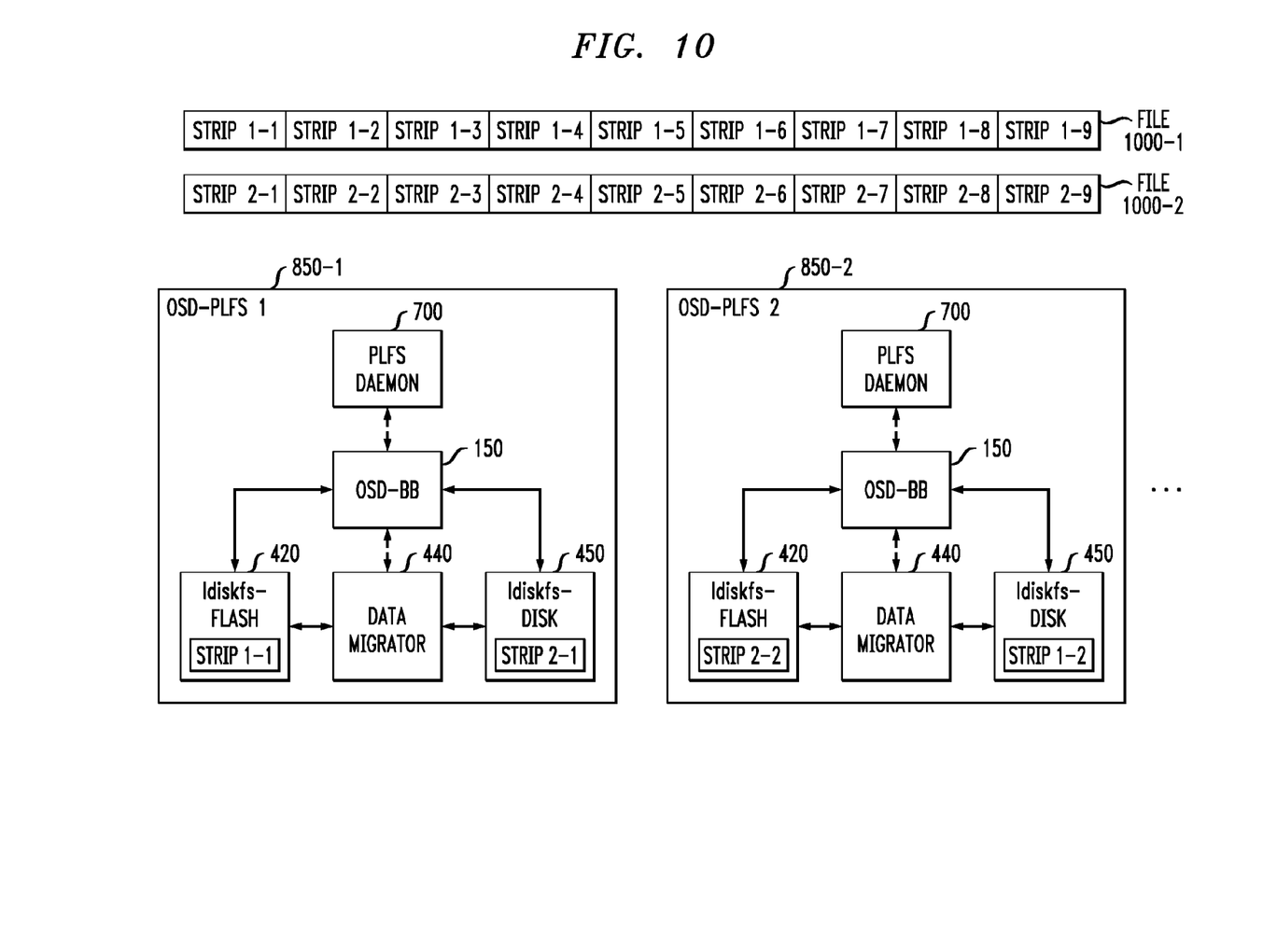
FIG. 10 illustrates two logical files that are striped across a plurality of OSSs.

FIG. 10 illustrates two logical files 1000-1 and 1000-2 that are striped across a plurality of OSSs, such as OSD-PLFS 850-1 and OSD-PLFS 850-2 of FIG. 8. As shown in FIG. 10, parts of file 1000-1 are stored on a flash storage device 105-1 and parts of file 1000-1 are stored on a disk device 105-2, and similarly for file 1000-2. As indicated above, when the files 1000-1 and 1000-2 are accessed, the performance will be that of the slowest piece so neither file layout will provide good read performance.

According to one aspect of the present invention, coordinated decisions are employed regarding the sub-files of a given file so that all or no sub-files of a given file are stored on a flash storage device 105-1. This ensures fast read performances for those files on a flash storage device 105-1 and slow read performance for those files on a disk storage device 105-2. Without the horizontal coordination provided by the present invention, it is much more likely that only some of the sub-files of a given file are stored on a flash storage device 105-1.

It is to be appreciated that the particular operations and associated messaging illustrated in FIGS. 3, 6 and 7 are exemplary only, and numerous other types of operations and messaging may be used in other embodiments.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the cluster file system 100. Such components can communicate with other elements of the cluster file system 100 over any type of network or other communication media.

As indicated previously, components of a burst buffer appliance as disclosed herein can be implemented at least in part in the form of one or more software programs stored in memory and executed by a processor of a processing device. A memory having such program code embodied therein is an example of what is more generally referred to herein as a "computer program product."

The cluster file systems 100 and 200 or portions thereof may be implemented using one or more processing platforms each comprising a plurality of processing devices. Each such processing device may comprise processor, memory and network interface components of the type illustrated for burst buffer appliance 150 in FIG. 1.

As indicated above, cluster file system functionality such as that described in conjunction with FIGS. 1 through 7 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of cluster file systems and associated clients, servers and other processing devices that can benefit from burst buffer implemented storage tiering control functionality as described herein. Also, the particular configurations of system and device elements shown in FIGS. 1, 2 and 4 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An object storage device of a cluster file system comprising a plurality of object storage servers and a plurality of object storage devices, comprising:
    a burst buffer appliance configured to communicate with said plurality of object storage servers of the cluster file system over a network;
    the burst buffer appliance further comprising:
    a controller configured to (i) implement storage tiering control functionality for at least first and second storage tiers comprising respective disjoint subsets of the plurality of object storage servers to control movement of data between the first and second storage tiers; and (ii) notify, in response to a read request for a first portion of a single logical file stored across a plurality of said object storage devices, at least one additional burst buffer appliance of at least one additional object storage device to implement a coordinated movement of data between first and second storage tiers of said at least one additional object storage device to pre-fetch at least one additional portion of said single logical file that is stored by said at least one additional object storage device;
    the object storage device being implemented utilizing at least one processing device coupled to a memory.

2. The object storage device of claim 1 wherein said burst buffer appliance further notifies said at least one additional object storage device to implement said coordinated movement of data between the first and second storage tiers such that substantially all portions of said single logical file that are stored across said plurality of said object storage devices in said cluster file system are stored in only one of said storage tiers at a given time.

3. The object storage device of claim 1 further comprising a parallel log structured file system daemon for communicating with parallel log structured file system daemons on other object storage devices in said cluster file system to implement said coordinated movement of data.

4. The object storage device of claim 3 wherein said parallel log structured file system daemon notifies one or more of said parallel log structured file system daemons on other object storage devices in said cluster file system to pre-fetch portions of said single logical file that are stored across said plurality of said object storage devices.

5. The object storage device of claim 1 wherein all portions of said single logical file that are stored across said plurality of said object storage devices are stored in said first storage tier.

6. The object storage device of claim 1 wherein all portions of said single logical file that are stored across said plurality of said object storage devices are stored in said second storage tier.

7. The object storage device of claim 1 wherein each of the object storage servers is configured to interface with at least one object storage target, and further wherein the object storage servers in the first storage tier are configured to interface with object storage targets of a first type and the object storage servers in the second storage tier are configured to interface with object storage targets of a second type different than the first type.

8. The object storage device of claim 7 wherein the object storage targets of the first type comprise respective non-volatile electronic storage devices including one or more of flash memory, magneto-resistive random-access memory (MRAM) and phase-change random access memory (PC-RAM).

9. The object storage device of claim 6 wherein the object storage targets of the second type comprise respective disk storage devices.

10. The object storage device of claim wherein the cluster file system comprises a Lustre file system.

11. The object storage device of claim 1 wherein the burst buffer appliance is further configured to communicate with a plurality of clients over the network and to process requests from said clients.

12. The object storage device of claim 1 wherein the controller comprises a data placement and migration controller.

13. The object storage device of claim 1 wherein at least a portion of the controller is implemented using data migration software at least a portion of which is stored in said memory and executed by said at least one processing device.

14. A processing platform comprising an object storage device of a cluster file system comprising a plurality of object storage servers and a plurality of object storage devices, said object storage device comprising:
    a burst buffer appliance configured to communicate with said plurality of object storage servers of the cluster file system over a network;
    the burst buffer appliance further comprising:
    a controller configured to (i) implement storage tiering control functionality for at least first and second storage tiers comprising respective disjoint subsets of the plurality of object storage servers to control movement of data between the first and second storage tiers; and (ii) notify, in response to a read request for a first portion of a single logical file stored across a plurality of said object storage devices, at least one additional burst buffer appliance of at least one additional object storage device to implement a coordinated movement of data between first and second storage tiers of said at least one additional object storage device to pre-fetch at least one additional portion of said single logical file that is stored by said at least one additional object storage device;

the object storage device being implemented utilizing at least one processing device coupled to a memory.

15. A method comprising:

configuring a burst buffer appliance of a cluster file system comprising a plurality of object storage servers and a plurality of object storage devices to communicate with a plurality of object storage servers of the cluster file system over a network; and implementing storage tiering control functionality in the burst buffer appliance for at least first and second storage tiers comprising respective disjoint subsets of the plurality of object storage servers to control movement of data between the first and second storage tiers; and notifying, in response to a read request for a first portion of a single logical file stored across a plurality of said object storage devices, at least one additional burst buffer appliance of at least one additional object storage device to implement a coordinated movement of data between first and second storage tiers of said at least one additional object storage device to pre-fetch at least one additional portion of said single logical file that is stored by said at least one additional object storage device.

16. The method of claim 15 wherein said burst buffer appliance further notifies said at least one additional object storage device to implement said coordinated movement of data between the first and second storage tiers such that substantially all portions of said single logical file that are stored across said plurality of said object storage devices in said cluster file system are stored in only one of said storage tiers at a given time.

17. The method of claim 15 further comprising the step of a parallel log structured file system daemon on a first object storage device communicating with parallel log structured file system daemons on other object storage devices in said cluster file system to implement said coordinated movement of data.

18. The method of claim 17 wherein said parallel log structured file system daemon is further configured to notify one or more of said parallel log structured file system daemons on other object storage devices in said cluster file system to prefetch portions of said single logical file that are stored across a plurality of said object storage devices.

19. The method of claim 15 further comprising moving data between the first and second storage tiers under control of the burst buffer appliance.

20. The method of claim 15 further comprising:

configuring the object storage servers in the first storage tier to interface with object storage targets of a first type; and configuring the object storage servers in the second storage tier to interface with object storage targets of a second type different than the first type;

wherein the first and second different types of object storage targets provide respective different levels of performance.

21. A computer program product comprising a non-transitory machine-readable storage medium having encoded therein executable code of one or more software programs, wherein the one or more software programs when executed cause a burst buffer appliance to perform the following steps:

configuring the burst buffer appliance of a cluster file system comprising a plurality of object storage servers and a plurality of object storage devices to communicate with a plurality of object storage servers of the cluster file system over a network;

implementing storage tiering control functionality in the burst buffer appliance for at least first and second storage tiers comprising respective disjoint subsets of the plurality of object storage servers to control movement of data between the first and second storage tiers; and notifying, in response to a read request for a first portion of a single logical file stored across a plurality of said object storage devices, at least one additional burst buffer appliance of at least one additional object storage device to implement a coordinated movement of data between first and second storage tiers of said at least one additional object storage device to pre-fetch at least one additional portion of said single logical file that is stored by said at least one additional object storage device.

22. A cluster file system comprising:

a burst buffer appliance; and a plurality of object storage servers coupled to the burst buffer appliance via a network;

a plurality of object storage devices:

the burst buffer appliance further comprising:

a controller configured to implement storage tiering control functionality for at least first and second storage tiers comprising respective disjoint subsets of the plurality of object storage servers;

the burst buffer appliance thereby being configured to (i) control movement of data between the first and second storage tiers: and (ii) notify, in response to a read request for a first portion of a single logical file stored across a plurality of said object storage devices, at least one additional burst buffer appliance of at least one additional object storage device to implement a coordinated movement of data between first and second storage tiers of said at least one additional object storage device to pre-fetch at least one additional portion of said single logical file that is stored by said at least one additional object storage device.

23. The system of claim 22 wherein said burst buffer appliance further implements said coordinated movement of data between the first and second storage tiers such that substantially all portions of a single logical file that are stored across a plurality of said object storage devices in said cluster file system are stored in only one of said storage tiers at a given time.

24. The system of claim 22 further comprising a parallel log structured file system daemon for communicating with parallel log structured file system daemons on other object storage devices in said cluster file system to implement said coordinated movement of data.

25. The system of claim 24 wherein said parallel log structured file system daemon notifies one or more of said parallel log structured file system daemons on other object storage devices in said cluster file system to pre-fetch portions of said single logical file that are stored across a plurality of said object storage devices.

26. The system of claim 22 wherein the cluster file system comprises a Lustre file system.

* * * * *

UNITED STATES PATENT AND TRADEMARK OFFICE
CERTIFICATE OF CORRECTION

| | | |
|---|---|---|
| PATENT NO. | : 9,454,331 B1 | Page 1 of 1 |
| APPLICATION NO. | : 13/928940 | |
| DATED | : September 27, 2016 | |
| INVENTOR(S) | : John M. Bent et al. | |

It is certified that error appears in the above-identified patent and that said Letters Patent is hereby corrected as shown below:

In the Specification

Column 1, Lines 30, 33, 40 and 49, replace "Lustre" with --Lustre®--.

Column 1, Line 30, replace "Linux-based" with --Linux®-based--.

Column 1, Line 55, replace "Additionally or alternatively," with --Additionally, or alternatively,--.

Column 6, Lines 53, 54, 56, 58 and 61, replace "Lustre" with --Lustre®--.

Column 7, Lines 2, 7, 17, 20, 28, 34 and 46, replace "Lustre" with --Lustre®--.

Column 8, Line 23, replace "metadata servers 208" with --metadata servers 108--.

Column 10, Lines 18, 22 and 34, replace "Lustre" with --Lustre®--.

Column 10, Line 21, replace "plug in" with --plug-in--.

Column 10, Lines 56 and 57, replace "pre-staging whereby," with --pre-staging, whereby,--.

Column 11, Lines 30, 49 and 54, replace "Lustre" with --Lustre®--.

Signed and Sealed this
Seventh Day of February, 2017

Michelle K. Lee
*Director of the United States Patent and Trademark Office*